US010432066B2

(12) United States Patent
Bickers et al.

(10) Patent No.: US 10,432,066 B2
(45) Date of Patent: Oct. 1, 2019

(54) GENERATING YOUR OWN POWER

(71) Applicant: Gyo Gym Limited, Bath, Somerset (GB)

(72) Inventors: Charley Bickers, Bath (GB); Richard Hobbs, Suffolk (GB); Martin Prescott, Godmanchester (GB)

(*) Notice: Subject to any disclaimer, the term of this patent is extended or adjusted under 35 U.S.C. 154(b) by 478 days.

(21) Appl. No.: 15/106,474

(22) PCT Filed: Dec. 18, 2014

(86) PCT No.: PCT/GB2014/053750
§ 371 (c)(1),
(2) Date: Jun. 20, 2016

(87) PCT Pub. No.: WO2015/092408
PCT Pub. Date: Jun. 25, 2015

(65) Prior Publication Data
US 2016/0336836 A1    Nov. 17, 2016

(30) Foreign Application Priority Data
Dec. 18, 2013   (GB) .................................. 1322478.7

(51) Int. Cl.
*H02K 33/00* (2006.01)
*H02K 7/18* (2006.01)
*H02K 21/24* (2006.01)
*H02K 3/26* (2006.01)
*A63B 21/22* (2006.01)
*A63B 21/005* (2006.01)
*A63B 22/06* (2006.01)
(Continued)

(52) U.S. Cl.
CPC ....... *H02K 7/1861* (2013.01); *A63B 21/0055* (2015.10); *A63B 21/0056* (2013.01); *A63B 21/225* (2013.01); *A63B 22/0605* (2013.01); *H02K 1/12* (2013.01); *H02K 1/27* (2013.01); *H02K 3/26* (2013.01); *H02K 3/32* (2013.01); *H02K 7/025* (2013.01); *H02K 7/1876* (2013.01);
(Continued)

(58) Field of Classification Search
CPC ...................................................... H02K 3/26
USPC .................... 310/25, 30, 36; 336/200; 322/3
See application file for complete search history.

(56) References Cited

U.S. PATENT DOCUMENTS 3,259,768 A    7/1966   Burr
3,944,857 A    3/1976   Faulhaber
(Continued)

FOREIGN PATENT DOCUMENTS

DE    102004043002 A1    3/2006
JP    S59105304 A    6/1984
JP    2001095221 A    4/2001

*Primary Examiner* — Hanh N Nguyen
(74) *Attorney, Agent, or Firm* — Diederiks & Whitelaw, PLC.

(57) ABSTRACT

A portable apparatus is disclosed for generating electrical power comprising a stator comprising a plurality of coils, coil units or coil segments for independently generating electrical power, wherein the stator comprises a printed coil laminate comprising a sheet of insulator material and a printed conductor comprising conductive ink printed upon the sheet of insulator material arranged to form the plurality of coils, coil units or coil segments and a reciprocator comprising a magnet, the reciprocator being responsive to vibrations and/or shocks and moves in that regard within the environs of the stator so as to generate electrical power. The apparatus is connectable to a portable electronic device so as to power that device and/or to a storage device for storing the generated electrical power.

14 Claims, 10 Drawing Sheets

(51) Int. Cl.
*H02K 1/12* (2006.01)
*H02K 1/27* (2006.01)
*H02K 3/32* (2006.01)
*H02K 7/02* (2006.01)
*H02K 11/00* (2016.01)
*H02K 11/04* (2016.01)
*H02K 35/02* (2006.01)

(52) U.S. Cl.
CPC ....... *H02K 11/0094* (2013.01); *H02K 11/046* (2013.01); *H02K 21/24* (2013.01); *H02K 35/02* (2013.01)

(56) References Cited

U.S. PATENT DOCUMENTS

| | | | |
|---|---|---|---|
| 5,177,389 A * | 1/1993 | Schalk | G01P 3/48 310/156.43 |
| 5,268,602 A | 12/1993 | Schwaller | |
| 5,637,945 A | 6/1997 | Yamamuro et al. | |
| 5,789,841 A | 8/1998 | Wang | |
| 5,955,813 A | 9/1999 | Bolte et al. | |
| 8,193,781 B2 | 6/2012 | Lin et al. | |
| 8,450,893 B2 | 5/2013 | Miyazaki et al. | |
| 8,890,519 B2 | 11/2014 | Klein | |
| 9,067,099 B2 | 6/2015 | Beard et al. | |
| 2003/0020353 A1 * | 1/2003 | Lopatinsky | H02K 1/2793 310/208 |
| 2006/0232161 A1 | 10/2006 | Odaka et al. | |
| 2008/0277094 A1 | 11/2008 | Peng et al. | |
| 2009/0085706 A1 * | 4/2009 | Baarman | H01F 5/003 336/200 |
| 2010/0244816 A1 | 9/2010 | Nakamura | |
| 2011/0057629 A1 * | 3/2011 | Lin | H02K 3/26 322/3 |
| 2012/0169148 A1 * | 7/2012 | Kim | H02K 33/16 310/25 |

* cited by examiner

GENERATING YOUR OWN POWER

CROSS REFERENCE TO RELATED APPLICATIONS

This application is the National Stage of International Application No. PCT/GB2014/053750, filed 18 Dec. 2014 which claims priority from and the benefit of United Kingdom patent application No. 1322478.7 filed on 18 Dec. 2013. The entire content of this application is incorporated herein by reference.

BACKGROUND TO THE PRESENT INVENTION

The present invention relates to a portable apparatus for generating electrical power, a system for generating and harvesting your own electrical power, and a method for generating and harvesting your own electrical power. The preferred embodiment also extends to a printed coil laminate and an apparatus for generating electrical power including a printed coil laminate. The preferred embodiment relates generally to harvesting energy from movement of a user—a by-product of either human exercise (active movement) or, for example, public transportation (passive movement). Active movement could be walking, running, aerobics, etc. Passive movement could be sitting on a train, or travelling in a car or on motorcycle. It is desired to store that energy so that it can then be either utilised either directly by a portable electronic device or, alternatively, the energy may be fed back into the mains supply grid and the cost of the energy credited back to the user, for example, by means of Government sponsored feed in tariffs.

Harvesting energy from human powered motion during exercise is known. Known arrangements typically involve the incorporation of a component, such as a conventional style AC generator, which is then coupled to a part of a piece of exercise equipment, such as a flywheel of an exercise bicycle, by means of an axle to axle drive belt, or a sprung friction wheel. Alternatively, other arrangements have utilised an existing electromagnetic load found within some equipment, and harvest that energy rather than dissipate it through a resistive load providing a heat-sink to the environment.

Harvesting energy from vibration is also known. Arrangements in this field have used technology such as piezoelectric elements, whose length and thickness are selected in order to resonate at the dominant resonant frequency of the system. Issues and problems associated with these existing devices centre around the fact that they are only suitable for generating energy from relatively high frequency vibration of, say, greater than 50 Hz and the amount of energy generated is quite small and, so, these types of devices tend to only find applications for local (off grid) power generation—for example, in remote sensors that are located in an environment experiencing high frequency vibration.

Harvesting energy from random kinetic energy movement is known and can be exemplified by a kinetic winder/charger in a watch. However, in comparison to other portable electronic devices, watches are much smaller and have a lower power consumption. Therefore, whilst this technology might suit watches, it is not suitable for powering larger drain electronic devices.

Harvesting energy from parasitic energy for example energy from compressive or impact forces (such as road or foot traffic) is known. Typically, only a small amount of energy may be harvested from a device of this kind in relation to the relatively costly infrastructure for capturing, storing and/or offloading that energy. Further, the device may further act as a damping force, thereby reducing energy efficiency.

A major disadvantage of known systems is their cost. The cost of components is relatively high in comparison to the value of the energy which can be harvested. For example, during cardiovascular exercise, the average user can maintain a continuous workload which equates to approximately up to 200 W of expended energy—this is considered an approximate maximum load beyond which the average person would not be able to pedal. Owing to losses within any system, the expended energy is, therefore, nearer to 150 W. Although prices fluctuate and, in general rise with time, an exemplary commercial electricity unit cost of £0.08 per kWh equates to a value of £ 0.008 per hour of cardiovascular energy. Obviously then, it is likely to take some time to pay back capital expenditure on equipment before starting to save money.

Furthermore, neodymium (NdFeB) magnets are expensive and are considered a critical resource. At present, the relative cost of NdFeB magnets is roughly double that of ferrite magnet relative to their BH/max value (which is a measure of the stored energy in the magnet). Whilst ferrite technology is older and less efficient, there are sometimes important reasons (cost being an example) why one might wish to use an inferior material.

It is therefore desired to provide a cost-effective consumer product which would more quickly allow the user to offset the cost of electricity supply by recovering energy associated with their various forms of active or passive movement.

SUMMARY OF THE PRESENT INVENTION

According to an aspect of the present invention there is provided a portable apparatus for generating electrical power comprising:

a stator comprising a plurality of coils, coil units or coil segments for independently generating electrical power, wherein the stator comprises a printed coil laminate comprising a sheet of insulator material and a printed conductor comprising conductive ink printed upon the sheet of insulator material arranged to form the plurality of coils, coil units or coil segments; and a reciprocator comprising a magnet, the reciprocator being responsive to vibrations and/or shocks and moves in that regard within the environs of the stator so as to generate electrical power;

wherein the apparatus is connectable to a portable electronic device so as to power that device and/or to a storage device for storing the generated electrical power.

The preferred embodiments of the invention may provide a particularly simple device for harvesting electrical power from external vibrations and/or shocks. This is achieved using a reciprocating magnet that is movable in response to such random excitations over a plurality of coils, coil units or coil segments provided by a printed coil laminate. It has been found that where the reciprocating magnet can move in multiple directions over a plurality of coils, coil units or coil segments it is advantageous for the coils, coil units or coil segments to be arranged to generate power independently of each other. In more conventional or linear generators the rotor or reciprocator rotates or slides in one direction over the coils and so the coils are generally connected in series to maximise the output. By contrast, where the magnet is moveable in more than one direction over the coils, coil units or coil segments, and so may move in different directions over different coils, coils units or coil segments, the induced currents may tend to cancel each other out when the coils are connected and thus reduce e.g. the peak to peak generated voltage. Using a plurality of independent coils, coil units or coil segments also lends itself to the use of multiple reciprocating magnets, each of which may move over the coils in different directions, for essentially the same reasons.

The stator preferably comprises a segmented conductive coil comprising a plurality of coil units for independently generating electricity.

The movement of the reciprocator is preferably controlled by magnetic forces and/or a resilient member.

The reciprocator preferably comprises a magnetised disc which is movable within a volume comprising the stator, wherein the magnetised disc is freely movable in all directions within a single plane.

The magnetised disc is preferably constrained to move only within the environs of the stator by repelling magnets which define the volume.

The stator is preferably circular and planar.

Electrical power is preferably generated using a low forward voltage AC to DC rectifier.

Each of the plurality of independent coils, coil units or coil segments is preferably directly connected to a low forward voltage AC to DC rectifier.

The reciprocator preferably comprises one or more toroidal magnets.

Each coil unit formed on the sheet of insulator material preferably comprises a coil, a first connector connectable with a second connector of a preceding coil unit and a second connector connectable with a first connector of a succeeding coil unit.

The sheet of insulator material is preferably flexible.

The printed conductor is preferably flexible.

According to another aspect of the present invention there is provided a method of generating electrical power comprising:

providing an apparatus comprising a stator comprising a plurality of conductive coils, coil units or coil segments, wherein the stator comprises a printed coil laminate comprising a sheet of insulator material and a printed conductor comprising conductive ink printed upon the sheet of insulator material arranged to form the plurality of coils, coil units or coil segments, and a reciprocator comprising a magnet;

vibrating and/or shocking the reciprocator so that the reciprocator moves within the environs of the stator so as to generate electrical power; and connecting the apparatus to a portable electronic device so as to power that device and/or to a storage device for storing the generated electrical power.

According to another aspect of the present invention there is provided a portable apparatus for generating electrical power comprising:

a stator comprising one or more conductive coils, coil units or coil segments arranged in a plane; and a reciprocator comprising a magnet suspended above the plane of the one or more coils, coil units or coil segments, the reciprocator being responsive to vibrations and/or shocks and being arranged to move within the environs of the stator so as to generate electrical power;

wherein the apparatus is connectable to a portable electronic device so as to power that device and/or to a storage device for storing the generated electrical power.

The magnet is preferably suspended above the plane of the one or more coils, coil units or coil segments so that the magnet is moveable over the plane of the one or more coils, coil units or coil segments.

The magnet is preferably suspended above the plane of the one or more coils, coil units or coil segments by a rod, a spring or a wire.

The magnet is preferably pivotally mounted above the plane of the one or more coils, coil units or coil segments such that the magnet is moveable over the plane of the one or more coils, coil units or coil segments in one or more directions.

The stator preferably comprises a plurality of coils, coil units or coil segments for independently generating electrical power.

The stator preferably comprises a printed coil laminate comprising a sheet of insulator material and a printed conductor comprising conductive ink printed upon the sheet of insulator material and arranged to form the one or more coils, coil units or coil segments.

According to another aspect of the present invention there is provided a method of generating electrical power comprising:

providing an apparatus comprising a stator comprising one or more conductive coils, coil units or coil segments arranged in a plane and a reciprocator comprising a magnet suspended above the plane of the one or more coils, coil units or coil segments;

vibrating and/or shocking the reciprocator so that the reciprocator moves within the environs of the stator so as to generate electrical power; and connecting the apparatus to a portable electronic device so as to power that device and/or to a storage device for storing the generated electrical power.

According to another aspect of the present invention there is provided a portable apparatus for generating electrical power comprising:

a stator comprising one or more conductive coils, coil units or coil segments; and a reciprocator comprising a magnet, the reciprocator being responsive to vibrations and/or shocks and which is arranged to move within the environs of the stator so as to generate electrical power;

wherein the apparatus is connectable to a portable electronic device so as to power that device and/or to a storage device for storing the generated electrical power.

The reciprocator preferably comprises a first magnet carrier and a second magnet carrier, the first and second carriers being cross-linked through a pivot so as to be moveable in opposite directions with respect to each other.

According to another aspect of the present invention there is provided a method of generating electrical power comprising:

providing an apparatus comprising a stator comprising one or more conductive coils, coil units or coil segments and a reciprocator comprising a magnet;

vibrating and/or shocking the reciprocator so that the reciprocator moves within the environs of the stator so as to generate electrical power; and connecting the apparatus to a portable electronic device so as to power that device and/or to a storage device for storing the generated electrical power.

According to another aspect of the present invention there is provided a printed coil laminate, for use with one or more magnets for producing electrical power, the laminate comprising: a sheet of insulator material suitable for receiving a printed conductor thereupon; and a printed conductor comprising conductive ink printed upon the sheet of insulator material, wherein the printed conductor is arranged to form a coil unit comprising: a coil; a first connector of the coil, connectable with a second connector of a preceding coil unit; and a second connector of the coil, connectable with a first connector of a succeeding coil unit.

Preferably, the printed coil laminate comprises a plurality of connected coil units.

Preferably, each coil unit is identical to its preceding and/or succeeding coil unit.

Preferably, the printed coil laminate is a strip of printed coil laminate comprising a continuous row of connected coil units.

Preferably, the sheet of insulator material comprises a slit between each coil unit.

Preferably, the coil comprises a plurality of parallel rows of conductive ink. Most preferably, the coil comprises a plurality of segments which are each able to generate electricity independently. Preferably, the plurality of rows of conductive ink are oriented in a slanted manner with respect to upper and/or lower edge(s) of a/the strip of printed coil laminate. Most preferably, oriented at approximately 45 degrees. Ideally, the rows of conductive ink are oriented such that they will have an incidence angle of approximately 90 degrees with a magnet or set of magnetic tracks. Therefore, it will be understood that the rows of conductive ink on the coil laminate may be oriented within a range of angles, whilst still maintaining the same approximate incidence angle with respect to the magnet or set of magnetic tracks. Naturally, an incidence angle of less than 90 degrees still generates electricity but is less efficient.

Alternatively, the coil may be a pancake-type coil.

Preferably, the sheet of insulator material is flexible and, further preferably, the printed conductor is flexible.

The printed coil laminate may be foldable to make a multi-layer coil.

Preferably, the conductive ink comprises copper and/or beryllium, or may comprise aluminium, or combinations thereof.

According to another aspect of the present invention there is provided an apparatus for generating electrical power comprising:

a rotor or reciprocator comprising a magnet; and a stator comprising a printed coil laminate as described above, wherein movement of the magnet with respect to the printed coil laminate generates electrical power in the stator.

Preferably, the rotor comprises a disc or annulus comprising one or more radially arranged, alternatingly poled magnets arranged to have a circumferential, circular or arc-like configuration.

Preferably, the stator comprises a disc or annulus comprising one or more radially arranged coil units, so arranged as to have a circumferential, circular or arc-like configuration.

Preferably, the stator comprises two or more coil units which are intermittently tapped to vary load, so that all available power and/or a portion thereof may be switched out. Further preferably, the stator comprises a plurality of segments (or coil units), capable of independently generating electricity.

Preferably, the magnet(s) and tracks of the coil(s) are provided in contrasting slanted formations.

Preferably, the magnet(s) and parallel tracks of the coil unit(s) are oppositely slanted in orientation to have an overlapping lattice-like formation. Further preferably, the magnet(s) and/or the parallel tracks are oriented at approximately 45 degrees to the angle of rotary movement, which may also be considered as oriented at 45 degrees to a radius. Ideally, the magnets and/or parallel tracks are oriented such that they will have an incidence angle of approximately 90 degrees, so as to optimise electricity generation. However, it will be understood that the magnets and parallel tracks may be oriented within a range of angles, whilst still maintaining the same approximate incidence angle with respect to each other. Naturally, an incidence angle of less than 90 degrees still generates electricity but is less efficient.

The rotor and stator may comprise similarly sized discs or annuli having magnets and coil units arranged radially towards their circumferences in corresponding locations for together generating electrical power. Preferably, the arrangement of magnets and the arrangement of tracks of the coils is oppositely slanted such as to provide an incidence angle of 90 degrees when the rotor is rotated. The rotor may comprise a disc or annulus comprising one or more magnets arranged in a radial manner towards the circumference of the disc and the stator comprises a disc or annulus which surrounds the rotor and comprises one or more pancake-type coil units.

The rotor may comprise a bicycle wheel having one or more alternatingly poled magnets arranged in a slanted, radial manner towards a circumference of the wheel and the stator comprises a pannier comprising a stationary coil unit, having oppositely slanted parallel tracks, disposed in an arc-like manner in proximity to the wheel. Preferably, the pannier comprises a charger/storage device for receiving electrical power generated through rotation of the wheel with respect to the pannier.

The rotor may comprise an exercise flywheel comprising one or more alternatingly poled magnets arranged radially towards a circumference of the wheel and the stator comprises a disc or annulus comprising a stationary coil unit disposed in a circular manner so as to correspond to the position of the one or more magnets. Preferably, the flywheel is manufactured from recycled plastics. Further preferably, the magnets may be suspended into the flywheel during manufacture.

The number of conductive tracks and magnets, or magnetic tracks, depends upon various factors, for instance the surface area available for location of the tracks or magnets, the load caused by inclusion of the tracks, and the intended use of the printed coil laminate. In general, including more tracks and magnets is preferred as this provides greater potential of harvesting energy; however, that comes at a cost of the ability of the user to generate electricity as load is likewise increased.

According to another aspect of the present invention there is provided a portable apparatus for generating electrical power comprising:

a stator comprising a conductive coil; and a reciprocator comprising a first magnetised portion of one polarity and a second magnetised portion of the other polarity, the reciprocator is responsive to vibrations and/or shock and moves in that regard within the environs of the stator so as to generate electrical power, wherein the apparatus is connectable to a portable electronic device so as to power that device and/or to a storage device for storing the generated electrical power.

Preferably, the stator comprises a printed coil laminate as defined in relation to the first aspect.

Preferably, movement of the reciprocator is controlled by magnetic forces or a resilient member.

Preferably, the stator comprises a plurality of coil phases.

Most preferably, a plurality of defined single-plane apparatuses are combined in various additional planes so as to provide a multi-plane electrical power generation apparatus.

Preferably, the conductive coil is segmented, comprising a plurality of coil units for independently generating electricity.

Preferably, the stator comprises a set of parallel conductive tracks and the reciprocator comprises a set of parallel, alternating polarity, magnetic tracks. Further preferably, the conductive tracks and the magnetic tracks are oriented to overlap and form a lattice-like configuration. Most preferably, movement of the reciprocator provides and incidence angle of about 90 degrees between the conductive tracks and magnetic tracks. Naturally, an incidence angle of less than 90 degrees still generates electricity but is less efficient.

Preferably, the reciprocator comprises one or more alternating polarity magnets and the stator comprises a wound coil arrangement in which the reciprocator moves within the stator in a through-coil arrangement. Most preferably, the coil comprises three phases.

Preferably, the reciprocator comprises a first magnet carrier and a second magnet carrier, the first and second carriers being cross-linked through a pivot so as to be movable in opposite directions with respect to each other. Most preferably, the coil is located between the two magnet carriers or surrounds them both.

Preferably, the reciprocator comprises a dual polarity magnet movable within a volume through a wound coil stator arranged to surround the volume/reciprocator. Preferably, the reciprocator comprises a magnetised disc which is movable within a volume comprising a stator, the magnetised disc is freely movable in all directions within a single plane but is constrained to move only within the environs of the stator by repelling magnets which define the volume. Preferably, the stator is circular and planar. Preferably, the stator comprises a plurality of coil units and, most preferably, six coil units.

According to another aspect of the present invention there is provided a system for generating and harvesting your own electrical power, the system comprising: means for generating user generated electrical power; and means for supplying such user generated power to a portable device to power said device, means for supplying such user generated power to a grid as part of a feed in scheme, or means for supplying such user generated power to a storage device for subsequent use.

Preferably, the means for generating or harvesting user generated power is an apparatus for generating electrical power as defined above (or herein); or a portable apparatus for generating electrical power as defined above (or herein).

According to another aspect of the present invention there is provided a method for generating and harvesting your own electrical power, the method comprising: generating user generated electrical power through active and/or passive movement of a generator device by the user; and supplying such user generated power to a portable electronic device to power said device, supplying such user generated power to a grid as part of a feed in scheme or supplying such user generated power to a storage device for subsequent use. Preferably, the generator device of the method is an apparatus for generating electrical power as defined above (or herein); or a portable apparatus for generating electrical power as defined above (or herein).

Advantageously, a user may harvest power from active or passive movement which might, otherwise, be considered wasted or parasitic energy. The preferred embodiment lends itself to those wishing to follow a 'green' lifestyle because components may be made from recycled materials and because low cost magnets are used. Printed coil laminates are quick and cheap to manufacture in contrast with wound coil technology.

Advantageously, an apparatus for generating power may be easily and/or discretely carried on the person of a user. Alternatively, it could be located in a hand-held item, such as a briefcase, or rucksack. Alternatively, it could be incorporated into a mobile electronic device, for example an mp3 player, tablet PC (personal computer) or mobile telephone. Further alternatively, it could be incorporated into an aftermarket casing for a mobile electronic device. Advantageously, the printed coil laminate is flexible. As the backing and the ink are flexible, the laminate may flex in various planes. However, provision of a slit allows the laminate to additionally flex and form a circular or arc-like configuration.

Advantageously, the preferred embodiment seeks to make use of low cost materials by leveraging a large surface area available on rotating parts in relation to the relatively low amount of energy potentially harvestable. Conventional electrical generators tend to be designed with compactness as the main criteria. This leads to the use of rare earth magnets, compact windings, etc. The preferred embodiment utilizes the large surface area available to enable the use of larger conventional ferrite magnets, for example. Similarly, the preferred embodiment utilises the large surface area available to enable the use of foil-on-polyimide or foil-on-acetate, printed copper coil technology. With particular reference to bicycle or exercise variants of the invention, as a wheel thereof typically has a large surface area, it is a good location for lower cost magnetic technology, as there is no desire to make the wheel any smaller or more compact. The same can be said for coils used with that technology. Advantageously, a lattice-like formation of overlapping magnets and coil tracks optimises the amount of harvestable energy. In particular, as each individual magnet may move across a conductor at an angle of less than 90 degrees (sub-optimal) and potentially not fully move across the conductor, because in a reciprocating version the magnet may approach and leave the conductor without ever fully crossing it, the lattice formation enables the conductors—oriented at plus 45 degrees—and the magnets—oriented at minus 45 degrees—to achieve a preferred incidence angle of 90 degrees. Advantageously, a segmented conductor coil may be particularly advantageous if more than one magnet or set of magnetic tracks will move relative to the conductor coil, as each segment may independently generate power—which might otherwise be negated or cancelled out by the movement of a different magnet or set of magnetic tracks if inducing flux in the same conductor (un-segmented) conductor.

BRIEF DESCRIPTION OF THE DRAWINGS

Various embodiments of the present invention will now be described, by way of example only, and with reference to the accompanying drawings in which.

DETAILED DESCRIPTION OF PREFERRED EMBODIMENT

A preferred embodiment of the present invention will now be described.

Figure 1A:
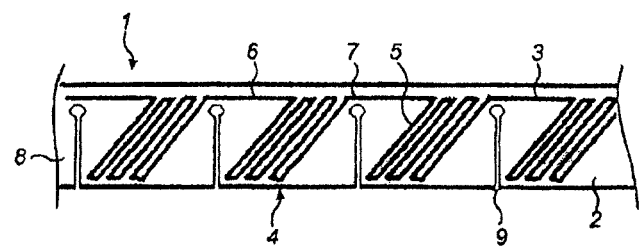
FIG. 1a is a side elevation of a printed coil laminate and FIG. 1b is a side elevation of the printed coil laminate of FIG. 1a shown in a curved configuration.
Figure 1B:
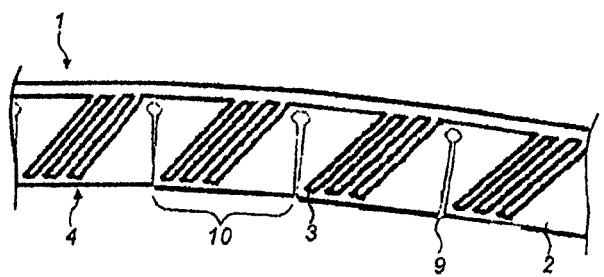

FIGS. 1a and 1b show a printed coil laminate, identified in general by reference 1. The laminate 1 includes a flexible backing 2 and a conductor 3. The flexible backing 2 is an insulating material, in this example KAPTON®—which is one example of a polyimide film commercially available and, of course, one could use a different insulating material. The conductor 3 is an ink which has been printed onto the flexible backing 2. The ink is a compound including copper which makes the ink both conductive and somewhat flexible. If additional flexibility is required, then the ink could also include beryllium. The ink has nominal thickness and a weight of approximately 310 g/m$^2$ (2 oz/ft$^2$). The conductor 3 is formed into a coil 4 through provision of a plurality of parallel conductive tracks 5 (of conductive ink). Each coil 4 is connected to a preceding coil 4 by a connector 6 and a succeeding coil 4 by a connector 7, forming individual coil units 10. The laminate 1 is shown as part of a strip 8 including a plurality of coil units 10 which, when manufactured as a strip 8, make the entire strip 8 one long coil arrangement. However, individual coils 4 (or multiples thereof) may be separated from the strip 8 to meet various requirements. The laminate 1 is flexible without breaking electric contact between respective coils 4 because the backing 2 and the conductor 3 are flexible. The laminate also includes a slit 9 between respective coils 4, which allow the laminate 1 to flex and form a curved or arc-like configuration, at least partially shown in FIG. 1b. As such, the laminate 1 may be placed around a curved object, for example a wheel (not shown). The slits 9 also help to demarcate individual coil units 10.

The laminate 1 is manufactured through a standard printing process in which the conductive ink (conductor 3) is deposited upon the backing 3 in the arrangement desired—for this example, as shown in FIGS. 1a and 1b.

The printed coil laminate 1 may be used as described in a number of the following examples. However, in general, motion of a rotor or reciprocator (not shown) with respect to the printed coil laminate 1 (stator) converts motion energy into electrical energy in the stator which may be used to power a portable electronic device, charge an energy storage device or may be converted into a form suitable for the feed in tariff scheme. The laminate may be curved, or folded back and forth so as to make multiple layers.

Figure 2A:
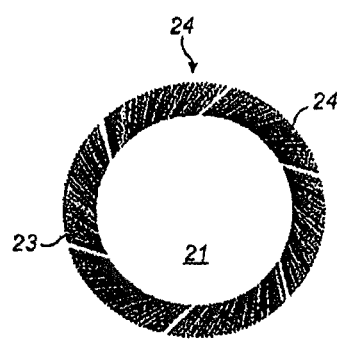
FIG. 2a is a partial schematic view of a disc including conductive tracks, being part of a rotary apparatus for generating power
Figure 2B:
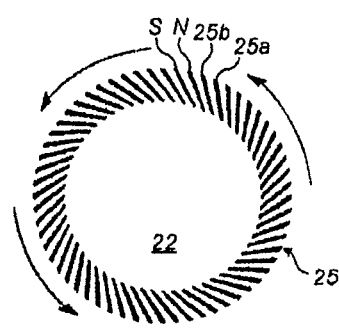
FIG. 2b is a partial schematic view of a disc including magnetic tracks, being part of a rotary apparatus for generating power.
Figure 3:
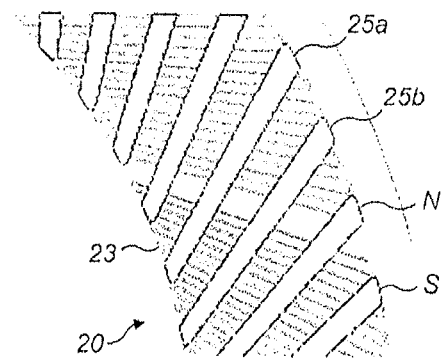
FIG. 3 is a partial schematic view of the disc of FIG. 2b when overlaying the disc of FIG. 2a, when part of a rotary apparatus for generating power.

FIGS. 2a, 2b and 3 show various parts of a rotary apparatus 20 for generating power. Various components which are conventional are not shown, although may be discussed briefly. The apparatus includes a first disc 21 and a second disc 22. The first disc 21 (stator) includes a plurality of conductive tracks 23 which are grouped into conductive units 24, of which there are six units 24 shown in FIG. 2a. A single unit 24, all six units 24, or a number of units 24 therebetween may be tapped so as to vary the load which may be switched out. The conductive tracks 23 are radially located but slanted in orientation so as to extend as the radius increases in a direction which is towards corresponding, but oppositely oriented magnetic tracks 25 in the second disc 22 (rotor), as shown in FIG. 2b. The magnetic tracks 25 are provided by alternating polarity tracks 25a—North—and 25b—South. Herein, and in the Figures, North and South magnetic polarity may be abbreviated as 'N' and 'S'. When the disc 21 and disc 22 are located in proximity to one another, so as to enable power generation, FIG. 3 shows schematically how the conductive tracks 23 and the magnetic tracks 25 would be correspondingly located but oppositely slanted in orientation, having an incidence angle of approaching 90 degrees. The advantage of this is to improve power generation efficiency. The conductive tracks 23 and conductive units 24 are preferably provided by a strip 8 of printed coil laminate 1, as described in relation to FIGS. 1a and 1b, although this is not essential. The apparatus 20, with slight modification, may be used to generate power from a bicycle when fitted to one or both bicycle wheels during manufacture or as a retro-fit option, or from an exercise flywheel, for example a flywheel of an exercise bicycle.

In use, upon rotation of the disc 22 (rotor), which causes the magnetic tracks 25 to move relative to the conductive tracks 23, rotational energy is converted into electrical energy in the disc 21 (stator) which may be used to power a portable electronic device, charge an energy storage device or may be converted into a form suitable for the feed in tariff scheme.

Figure 4:
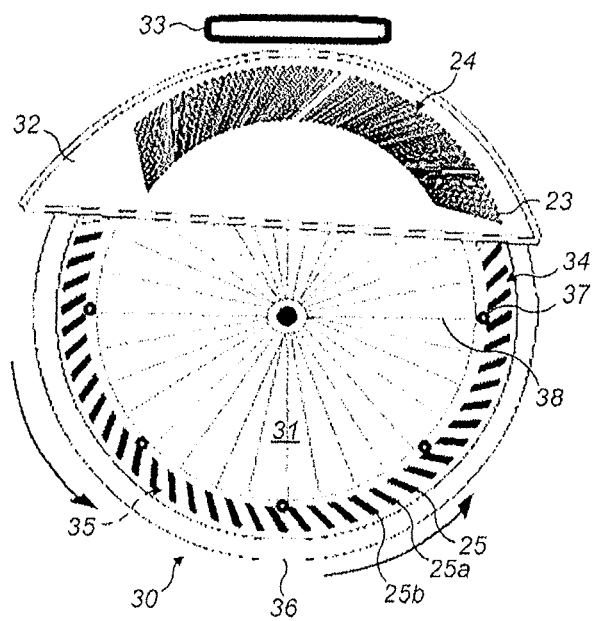
FIG. 4 is a side elevation of a bicycle wheel and pannier apparatus for generating power.

FIG. 4 is a view of a bicycle wheel and pannier apparatus 30 for generating power. The apparatus 30 shown is, naturally, only part of a bicycle. This arrangement includes various common features with the embodiment of FIGS. 2 to 3 above and, therefore, only the differences will be described in detail. Further, the same references have been used to identify those common features. The apparatus 30 includes a bicycle wheel 31, pannier 32 and a storage device 33. The wheel 31 includes an annulus 34 (rotor) located towards a circumference 35 of a rim—but not overlapping a tyre 36—which includes a plurality of magnetic tracks 25, oriented as previously described. The annulus 34 is connected to the wheel 31 using various fixtures 37, which ideally connect around a spoke 38 of the wheel 31. The pannier 32 (stator) includes two conductive units 24, including various conductive tracks 23 located in proximity to the annulus 34 in which power is generated upon rotation of the wheel 31. The conductive tracks 23 and conductive units 24 are preferably provided by a strip 8 of printed coil laminate, as described in relation to FIGS. 1a and 1b, although this is not essential. A storage device 23, in this example for storing energy and subsequently supplying to a grid, is provided to receive electrical energy from the pannier 32 and store the energy for subsequent feed in. The apparatus 30 may be supplied with a new bicycle or be a retrofit item. The pannier 32 is, preferably, made from recycled plastics.

In use, when a user pushes the bicycle or cycles so as to turn the wheel 31, which causes the magnetic tracks 25 to move relative to the conductive tracks 23, rotational energy of the annulus 34 is converted into electrical energy in one or both units 24, which energy is then stored in the storage device 33. Naturally, the energy could be harvested for a different reason, for example to power the lights of the bike or power a portable electronic device, although these are perhaps less preferred.

Figure 5:
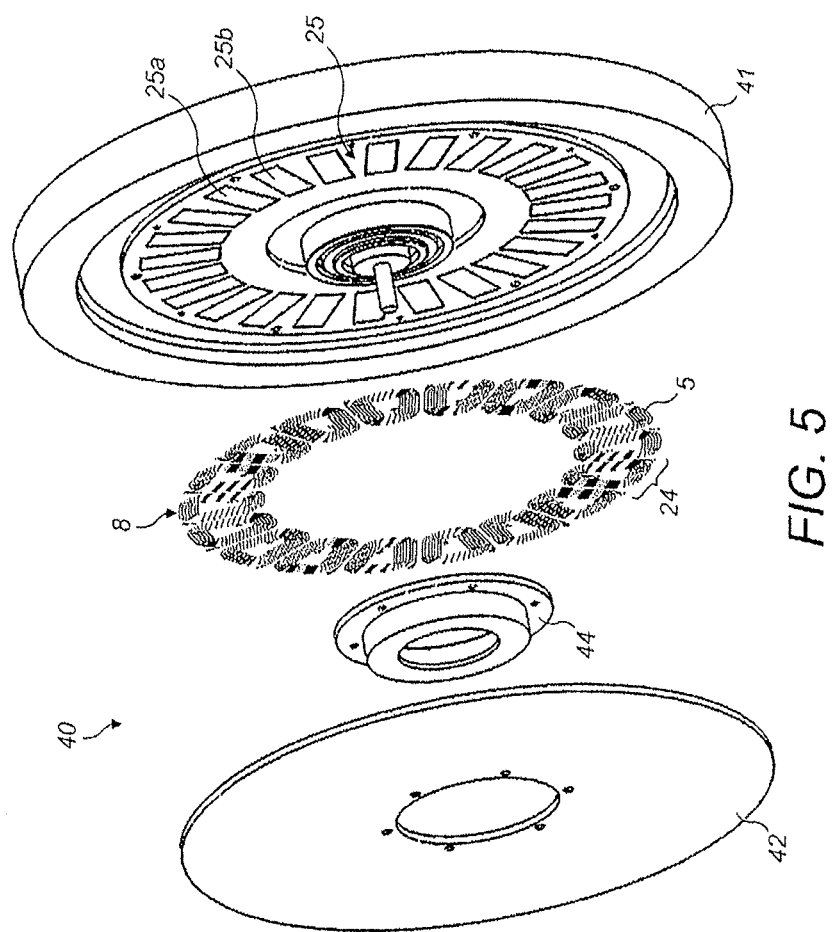
FIG. 5 is an exploded view of an exercise flywheel apparatus for generating power.

FIG. 5 shows an exercise flywheel apparatus 40 for generating power. This arrangement includes various common features with the embodiment of FIGS. 2 to 3 above and, therefore, only the differences will be described in detail. Further, the same references have been used to identify those common features. The apparatus 40 includes a flywheel 41, a disc 42, a restraining bracket (not shown) and a spacer 44. The spacer 44 separates the flywheel 41 and the disc 42 allowing the flywheel 41 to rotate, and the restraining bracket fixes the disc 42 keeping it stationary. The exercise flywheel 41 could be that of an exercise bicycle, a cross-trainer, rowing machine or the like. The flywheel 41 includes a plurality of magnetic tracks 25 which are radially located on the flywheel 41 and are located around a circular path on the flywheel. Independent tracks 25a (N); 25b (S) are, as shown, preferably surface mounted onto the flywheel 41, which is made from recycled plastics. Alternatively, the magnetic tracks 25 could be moulded within the flywheel, although this is less preferred. The disc 42 includes a plurality of conductive units 24, located on a surface of the disc facing the flywheel 41. The conductive tracks 5 and conductive units 24 are preferably provided by a strip 8 of printed coil laminate 1 which is curved, in a similar manner to that of FIG. 1b, and fixed or bonded to the disc 42, although this is not essential. The disc 42 and flywheel 41 may rotate relative to each other without touching and thereby generate power.

In use, a user rotates the flywheel 41 during exercise, which causes the magnetic tracks 25 to move relative to the conductive units 24, which converts the rotational energy of the flywheel 41 into electrical energy. The electrical energy may be used to power a portable electronic device, charge an energy storage device or may be converted into a form suitable for the feed in tariff scheme.

Figure 6:
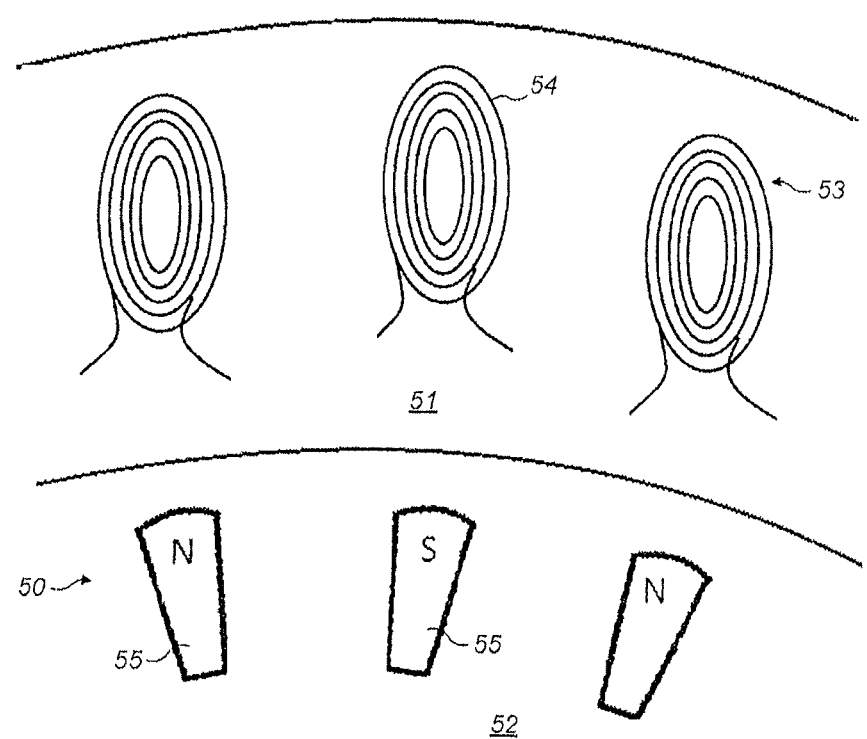
FIG. 6 is a partial schematic view of a disc including conductive tracks and a disc including magnetic tracks of a further rotary apparatus for generating power.

FIG. 6 shows an alternative rotary apparatus 50 for generating power. In essence the embodiment of FIG. 6 will operate in a very similar manner to the embodiment of FIGS. 2a, 2b and 3 and the technology, with only small modification, is deemed applicable to the embodiments of FIG. 4 and FIG. 5. The main difference is that an annulus 51 (stator), which surrounds a disc 52 (rotor), includes a plurality of pancake-type coils 53 which are located radially towards an outer edge of the annulus 51. Each pancake-type coil 53 includes a plurality of conductive tracks 54. The pancake-type coils 53 may be provided by a strip 8 of printed coil laminate 1—in a similar manner to the embodiment described in relation to FIGS. 1a and 1b, or may be otherwise fastened to or embedded into the annulus 51. A plurality of magnetic tracks 55 of alternating polarity are provided in a radial manner towards the circumference of the disc 52.

In use, upon rotation of the disc 52, which causes the magnetic tracks 55 to move relative to the conductive tracks 54, rotational energy is converted into electrical energy in the annulus 51 which may be used to power a portable electronic device, charge an energy storage device or may be converted into a form suitable for the feed in tariff scheme.

Figure 7:
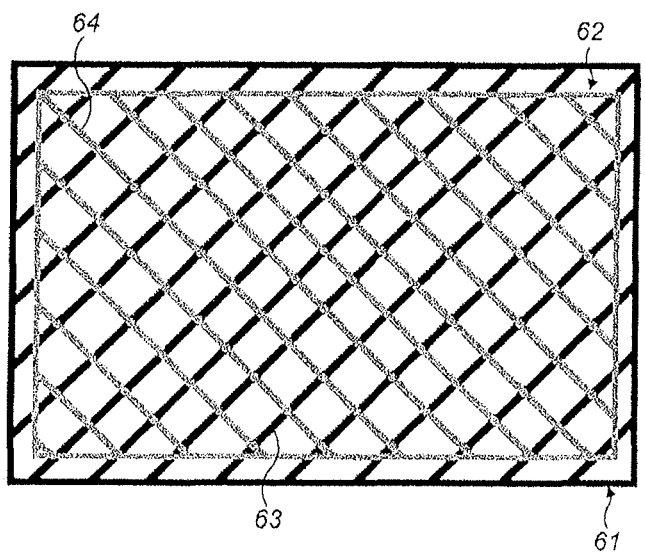
FIG. 7 is an exploded view of a set of conductive tracks and magnetic tracks suitable for use in a portable apparatus for generating power.
Figure 8:
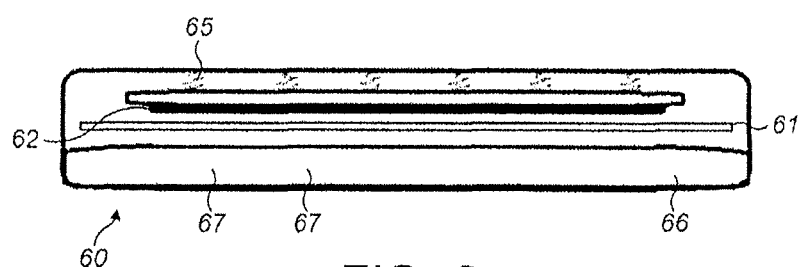
FIG. 8 is a partial schematic view of a portable apparatus for generating power, including the conductive and magnetic tracks of FIG. 7.

FIGS. 7 and 8 show, respectively, an exploded view of a set of conductive tracks 61 and magnetic tracks 62 suitable for use in an apparatus for generating power, and an apparatus 60 for generating power. In FIG. 7, the conductive tracks 61 provide a plurality of parallel rows of conductors 63 and the magnetic tracks 62 provide a plurality of parallel rows of alternating polarity magnets 64. For ease of reference, the tracks 61; 62 are shown in a partial overlapping, partial non-overlapped configuration in FIG. 7; however, in use they would be relatively planar, more akin to as shown in FIG. 8. The parallel rows 63; 64 are oriented at approximately 90 degrees to one another and, without touching each other, the magnetic tracks 62 may be moved with respect to the conductive tracks so as to generate power. With reference to FIG. 8 also, the conductive tracks 61 and the magnetic tracks 62 are located within an apparatus 60 for generating power. The apparatus additionally includes suspending float springs 65, for suspending the magnetic tracks 62, a battery 66, one or more ports 67 for using the generated power, and a casing 68, for enclosing and protecting the various components of the apparatus 60. The float springs 65 allow the magnetic tracks 62 to move in response to receipt of vibrations and/or shock with respect to relatively stationary conductive tracks 62, when considering the apparatus 60 as a whole. A weight 69, like the magnetic tracks 62, is suspended by the float springs 65, as this makes the apparatus 60 more sensitive to movement. In this example, power generated is intended to be stored in the battery 66; however, that does not preclude it for being used to power an electronic device nor be converted into a form suitable for the feed in tariff scheme.

In use, whether a user is being active or whether experiencing passive vibrations and/or shock, the magnetic tracks 62 (reciprocator) move in relation to the conductive tracks 61 (stator) which converts a linear movement energy into electrical energy. The electrical energy is then stored in the battery 66 for subsequent use. When one desires to use the stored energy, this can be achieved through connecting a lead to one of the ports 67.

Figure 9A:
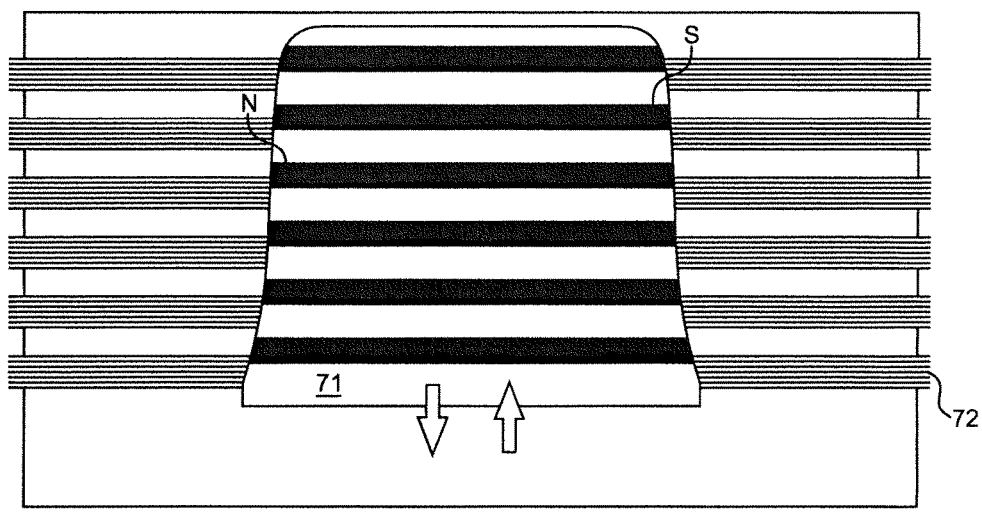
FIGS. 9a and 9b are, respectively, a partial schematic view of a portable apparatus for generating power and a partial cross-sectional view of the apparatus for generating power.
Figure 9B:
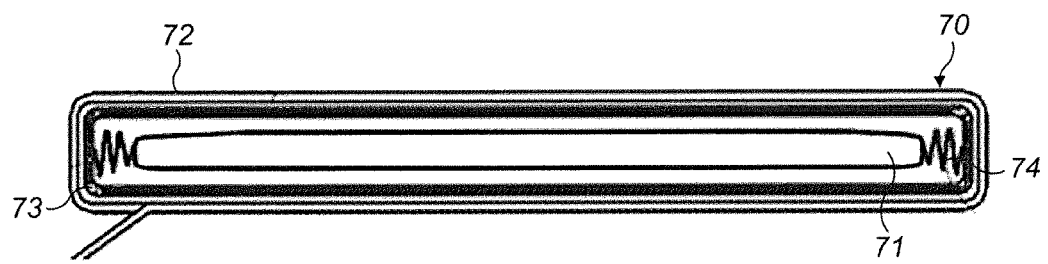

FIG. 9a shows a partial-cross-sectional, partial-schematic view of a further apparatus 70 for generating power. The apparatus 70, as shown in FIG. 9b, includes a magnet carrier 71 (reciprocator) and a coil winding 72 (stator) shown in partial cross-section. The magnet carrier 71 is located, in a through-coil manner, within the coil winding 72. A casing 73 protects and supports the magnet carrier 71 and the coil winding 72 is wound around an outside of the casing 73. Float springs 74 suspend the magnet carrier 71 from internal surfaces of the casing 73, such that the magnet carrier 71 is freely movable in response to vibration and/or shock in one plane, although the float springs do control movement to some extent. The magnet carrier 71 may be weighted so as to make it more responsive to vibration and/or shock. Owing to the float springs 74, the magnet carrier is resiliently movable within the casing with respect to the relatively stationary coil winding 72—when considering the apparatus 70 as a whole—in order to generate power. The magnet carrier 71 includes a plurality of alternating polarity magnets designated 'N' and 'S' in FIG. 9a. The coil winding 72 includes three phases of windings, so as to improve efficiency.

In use, whether a user is being active or whether experiencing passive vibrations and/or shock, the magnetic carrier 71 moves in relation to the coil windings 72 which converts a linear movement energy into electrical energy, which may be used to power a portable electronic device, charge an energy storage device or may be converted into a form suitable for the feed in tariff scheme.

Figure 10:
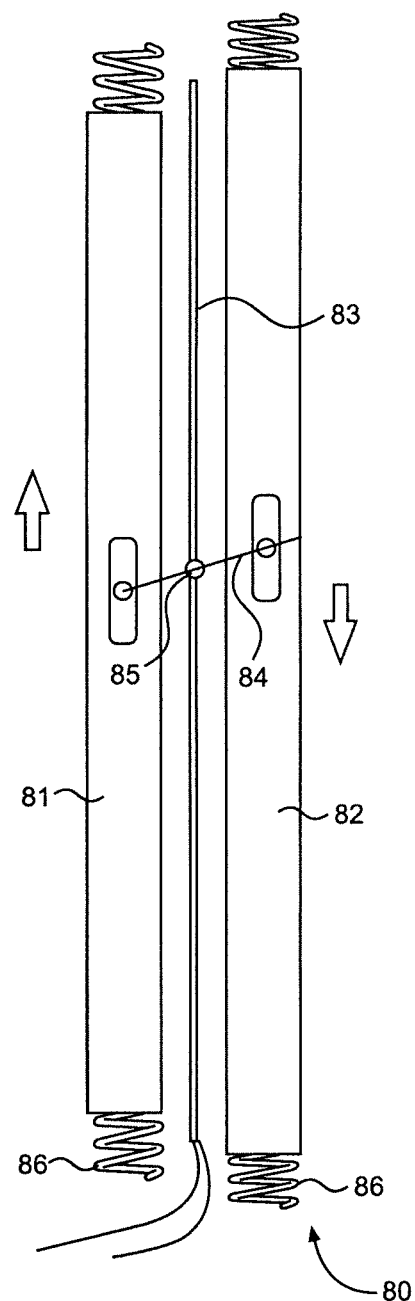
FIG. 10 is a partial schematic view of a portable apparatus for generating power.

FIG. 10 shows a further apparatus 80 for generating power. The apparatus 80 includes a first magnet carrier 81 (reciprocator), a second magnet carrier 82 (reciprocator) and a coil winding 83 (stator). The first and second magnet carriers 81; 82 include a plurality of magnetic tracks of alternating polarity. For optimal performance, a ratio of three-to-four coils to alternate magnets is preferred. The first and second magnet carriers 81; 82 are pivotally connected by a rod 84 about a pivot 85 forming a cross-linkage effect such that, when one moves in a first direction in a plane, the second is caused to move in the same plane but in an opposite direction. Each of the magnet carriers 81; 82 are resiliently held by float springs 86 within a casing (not shown) which allows them to move freely in response to vibration and/or shock, but which limits to some extent their range of movement. The magnet carriers 81; 82 move relative to the coil winding 83—when considering the apparatus as a whole—in order to generate power. Owing to there being two movable magnet carriers, the apparatus may be fine-tuned to a preferred frequency, for example 3 Hz—this being the dominant frequency of trains—and the magnet carriers 81; 82 each being responsive to that frequency provide double the efficiency of a single moving magnet carrier.

Figure 11:
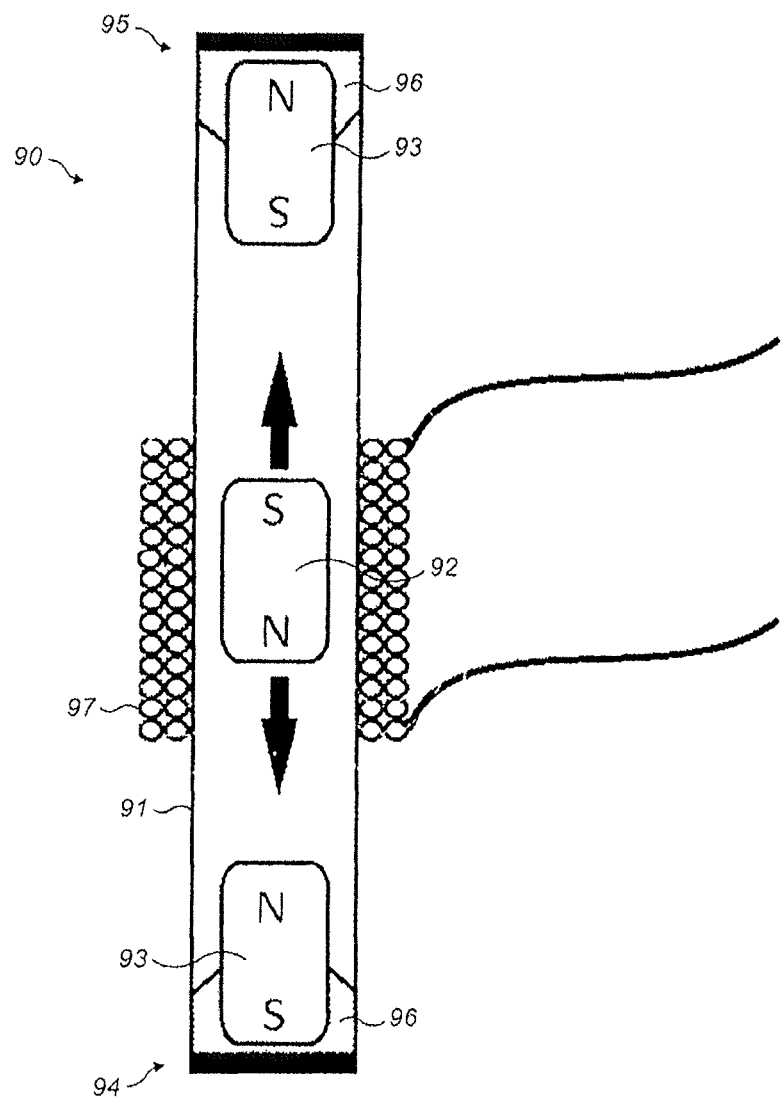
FIG. 11 is a partial schematic view of a portable apparatus for generating power.

In use, for example when one is sat on a train, the dominant frequency of movement—or indeed non-dominant frequencies also—cause one or both of the magnet carriers 81; 82 to move with respect to the coil winding 83 which converts a linear movement energy of the magnet carrier 81; 82 into electrical energy, which may be used to power a portable electronic device, charge an energy storage device or may be converted into a form suitable for the feed in tariff scheme. FIG. 11 shows an apparatus 90 for generating power. Only one apparatus 90 is shown in a y-plane; however, identical apparatuses but oriented in an x-plane and a z-plane compliment the effectiveness of just a y-plane apparatus providing a multi-plane device, responsive to vibration and/or shock in at least the three planes. As identical, one need only describe one example and the following is a description of the y-plane apparatus 90. The apparatus 90 includes a tube 91, which contains a movable dual polarity magnet 92 (reciprocator) and a pair of stationary magnets 93. The tube has a first end 94 and a second end 95—each end including a region of adhesive 96 for securing one of the magnets 93. A conductor coil 97 (stator) is wrapped around the tube 91 such that the windings are at about 90 degrees orientation to a direction of movement of the movable magnet 92. The magnets 93 are oppositely disposed in polarity in the ends 94; 95—designated 'N' and 'S'—such that they repel a different end of the movable magnet 92, which itself is designated 'N' and 'S'. Therefore, the effect of the two magnets 93 is to allow magnet 92 to move in a linear manner through the conductor coil 97, whilst limiting movement thereof with magnetic repulsion at the ends of the tube 91.

In use, whether a user is being active or whether experiencing passive vibrations and/or shock in a y-plane, the movable magnetic 92 moves in relation to the conductor coil 97, within the tube 91, which converts a linear y-plane movement energy into electrical energy, which may be used to power a portable electronic device, charge an energy storage device or may be converted into a form suitable for the feed in tariff scheme. By combining a y-plane apparatus 90 with both x-plane and z-plane apparatuses, electrical energy can be generated when vibration and/or shock in any or all of the planes is/are experienced.

Figure 12:
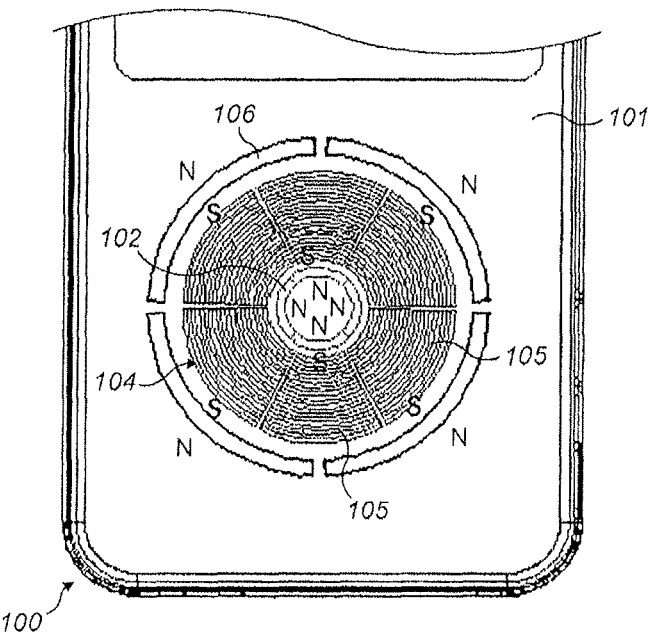
FIG. 12 is partial schematic view of a mobile electronic device including an apparatus for generating power.
Figure 13:
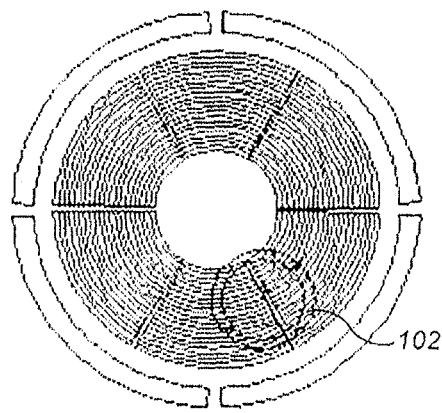
FIG. 13 is a schematic view of the apparatus for generating power of FIG. 12 in use.
Figure 14:
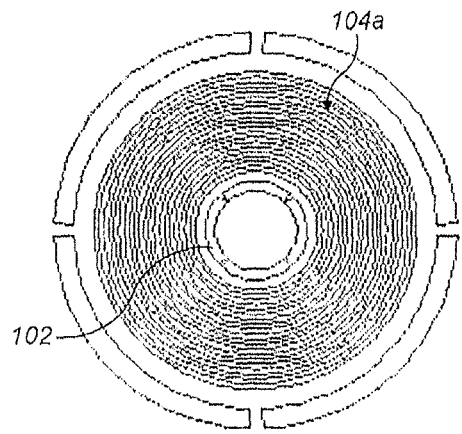
FIG. 14 is a schematic view of an alternative apparatus for generating power within a mobile electronic device.

FIGS. 12 to 14 show aspects of a further apparatus 100 for generating power. The apparatus 100 is located within a mobile electronic device 101 and includes a toroid magnet 102 (reciprocator) and a volume 103 within which the magnet 102 may move in one plane. The apparatus 100 also includes a circular conductor coil 104 (stator), in the form of six segments of equal size, each segment providing a conductor unit 105. The conductor coil 104 is located within the volume 103. The magnet 102 is dual polarised and has a first polarity, designated 'N', in a central region thereof and a second polarity, designated '8', around its circumference. By contrast, the volume 103 has an oppositely polarised barrier 106—on an inside surface designated 'S' and on an outside surface designated 'N'—which extends around and defines a periphery of the volume 103. The effect of the oppositely polarised barrier 106 is to constrain movement of the magnet 102 to stay within the volume 103 where it is in proximity to the conductor coil 104. The magnet 102, subject to repelling forces at the barrier 106, is free to move around the volume 103. As it does so, in response to vibration and/or shock, magnets are caused to move relative to the conductor coil 104, which generate power.

In use, whether a user is being active or whether experiencing passive vibrations and/or shock, the magnet 102 moves in relation to the coil conductor 104—as exemplified in FIG. 13—which converts a movement energy into electrical energy, which may be used to power a portable electronic device, charge an energy storage device or may be converted into a form suitable for the feed in tariff scheme. The version shown in FIGS. 12 and 13 particularly suits an apparatus including one or more toroid magnets 102, in particular more than one toroid magnet 102. Each segment or unit 105 of the conductor coil 104 may independently interact with the magnet(s) 102 when it/they move(s) across it, so as to independently (from the other units 105) generate electricity.

Of course, the polarities of the magnetic disc 102 and the barrier 106 may be reversed and the apparatus still achieve the same overall result.

FIG. 14 shows an alternative embodiment in which the circular conductor coil 104a is not segmented. This version suits a single toroid magnet 102 more readily, otherwise different magnets interacting with the same coil 104a could negate or cancel out some of the induced flux caused by another magnet.

In the embodiments shown in FIGS. 12, 13 and 14 the reciprocating magnet 102 can move freely in all directions within a single plane above the coil(s) 104. The magnet 102 is balanced or suspended within the environs of the coil(s) 104 using e.g. magnetic barriers 106 or springs. These provide a certain balancing force that may return the magnet 102 towards the centre of the coils when it is displaced. The forces required to balance the magnet in multiple directions within the plane are relatively high, e.g. compared to a linear device, and so the magnet 102 tends to reciprocate at a relatively fast rate, with relatively low amplitude. It has been found that these embodiments are most efficient when vigorously shaken or subjected to movements that involve a constant rapid change of direction, e.g. footfalls when jogging or suspension shocks. The efficiency may be increased by adjusting the aspect ratios of the magnet 102 and coil(s) 104 dependent on the desired use of the apparatus.

Figure 15:
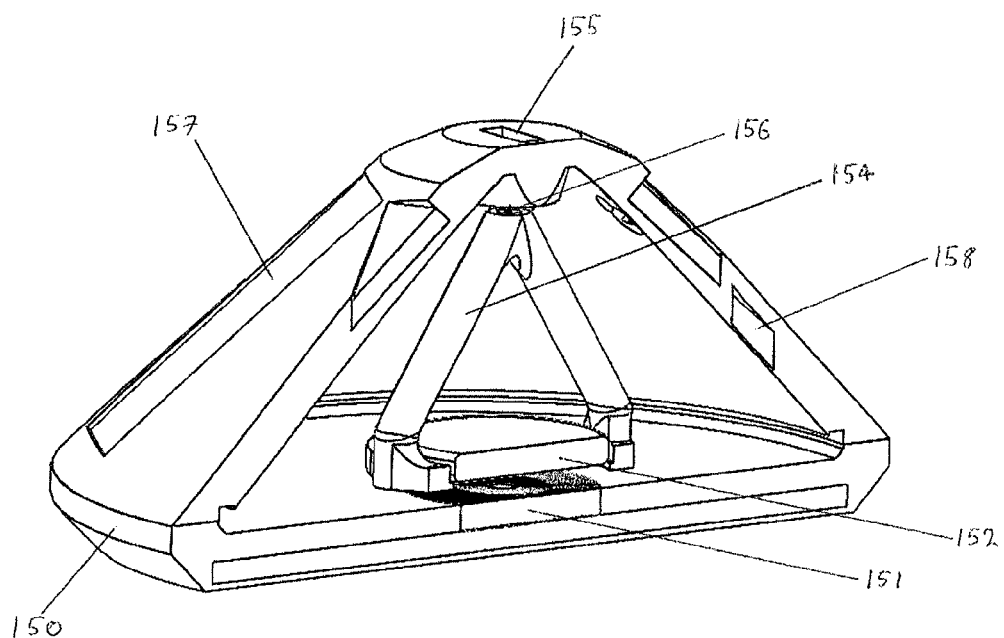
FIG. 15 is a schematic view of another portable apparatus for generating power.

In another embodiment shown in FIG. 15, a magnet, e.g. a magnetised disc, 152 is suspended above the plane of one or more conductor coil 151. The magnet 152 is pivotally suspended so that it can freely move over the coil 151 in any direction in response to shocks and/or vibrations and hence generate an induced current. In the apparatus illustrated in FIG. 15 the magnet 152 is mounted within a magnet holder 154 connected to a pivot point by arm 156. The arm 156 is freely pivotal about the pivot point so that the magnet 152 is movable in a pendulum-like manner over the plane of the coils 151. It will be understood that the magnet holder 154 is not essential and the magnet 152 may, for instance, be directly connected to the pivot point or to the arm 156. The arm 156 may be provided by a rod or wire so that vertical motion, i.e. movement towards the pivot point, of the magnet 152 is restricted. Alternatively, the arm 156 may comprise e.g. a spring so that the magnet 152 is also moveable towards the pivot point. The apparatus is preferably contained within a housing 150, with the coils 151 embedded or formed into the base of the housing and the pivot point situated on the opposite surface, i.e. the roof of the housing.

It has been found that free-swinging arrangements like that shown in FIG. 15 are particularly suited to harvesting energy from relatively subtle or swaying motions. This may be suitable for generating power from relatively gentle motion e.g. from walking. It is believed that the magnet 152 when pivotally suspended above the coils is more responsive to such subtle movements than e.g. the magnetically balanced embodiments described above because the forces required to centrally balance the magnet are lower. The pivot point and the arm 156 are suitably chosen to provide a low friction force at the pivot.

The coils 151 may be provided by a printed coil laminate in the same manner set out above. Alternatively, more conventional e.g. wound coils may be used and embedded into the housing. The reciprocating magnet may be either an NdFeB magnet or a ferrite depending on cost or size considerations. Again, the aspect ratio and weight of the magnet may be adjusted to increase the efficiency of the device.

The housing 150 may optionally also include one or more solar cells 157 for generating additional power. The solar sell cabling 158 may be disposed within the housing 150. The housing may contain a port, e.g. a USB port, 155 for receiving a standard charging lead. The housing 150 may thus define a self-contained apparatus for generating power.

The various apparatuses described above may be used to generate your own power. Power generated by movement, whether that be actively moving through exercise, or passive movement, by being located in a vibrational environment, may be converted from AC to DC using a low forward voltage AC/DC rectifier, which is well-known, but suits this purpose very well because of the low maximum voltages which are obtainable through harvesting power generated by such movement. This could be undertaken through a grid-tied inverter. Further, power generated may be supplied through a standard 5V USB port, through a jack port for various laptop computers, or may be passed through a transformer for providing different voltages depending upon the desired item to be powered. Storage devices, for example batteries, may be Ni-MH (nickel-metal hydride) rechargeable batteries and could be of any particular size, although standard household sizes of AA, AAA, C and D are preferred. If additional power is required, a solar cell may be incorporated into the system. Reciprocal versions may require interconnection between each conductor.

Float springs and/or repulsive magnetic forces will be selected and tailored to the mass of the independent movable parts, such that the resonant frequency of those parts—when considered as a first order spring-mass system—is matched with the specific application. For example, if it is desired to generate power whilst travelling on a train, the dominant frequency is about 3 Hz. In order to achieve that, it is possible that a rotor or reciprocator, and stator may float to some extent.

Although the present invention has been described with reference to preferred embodiments, it will be understood by those skilled in the art that various changes in form and detail may be made without departing from the scope of the invention as set forth in the accompanying claims.

The invention claimed is:

1. A portable apparatus for generating electrical power comprising:
    a stator comprising a plurality of coils, coil units or coil segments for independently generating electrical power, wherein the stator comprises a printed coil laminate comprising a sheet of insulator material and a printed conductor comprising conductive ink printed upon the sheet of insulator material arranged to form said plurality of coils, coil units or coil segments; and
    a reciprocator comprising a magnet, the reciprocator being responsive to vibrations and/or shocks and moves in that regard within an environs of the stator so as to generate electrical power, wherein the reciprocator comprises a magnetised disc which is movable within a volume comprising said stator, and wherein the magnetised disc is freely movable in all directions within a single plane;
    wherein the apparatus is connectable to a portable electronic device so as to power that device and/or to a storage device for storing the generated electrical power.

2. Apparatus as claimed in claim 1, wherein said stator comprises a segmented conductive coil comprising a plurality of coil units for independently generating electricity.

3. Apparatus as claimed in claim 1, wherein the movement of the reciprocator is controlled by magnetic forces and/or a resilient member.

4. Apparatus as claimed in claim 1, wherein the magnetised disc is constrained to move only within the environs of the stator by repelling magnets which define the volume.

5. Apparatus as claimed in claim 1, wherein the stator is circular and planar.

6. Apparatus as claimed in claim 1, wherein electrical power is generated using a low forward voltage AC to DC rectifier.

7. Apparatus as claimed in claim 6, wherein each of said plurality of independent coils, coil units or coil segments is directly connected to a low forward voltage AC to DC rectifier.

8. Apparatus as claimed in claim 1, wherein the reciprocator comprises one or more toroidal magnets.

9. Apparatus as claimed in claim 1, wherein each coil unit formed on said sheet of insulator material comprises a coil, a first connector connectable with a second connector of a preceding coil unit and a second connector connectable with a first connector of a succeeding coil unit.

10. Apparatus as claimed in claim 1, wherein said sheet of insulator material is flexible.

11. Apparatus as claimed in claim 1, wherein said printed conductor is flexible.

12. A method of generating electrical power comprising:
providing an apparatus comprising a stator comprising a plurality of conductive coils, coil units or coil segments for independently generating electrical power, wherein the stator comprises a printed coil laminate comprising a sheet of insulator material and a printed conductor comprising conductive ink printed upon the sheet of insulator material arranged to form said plurality of coils, coil units or coil segments, and a reciprocator comprising a magnet, the reciprocator being responsive to vibrations and/or shocks and moves in that regard within an environs of the stator so as to generate electrical power, wherein the reciprocator comprises a magnetised disc which is movable within a volume comprising said stator, and wherein the magnetised disc is freely movable in all directions within a single plane;
vibrating and/or shocking said reciprocator so that said reciprocator moves within the environs of the stator so as to generate electrical power; and
connecting the apparatus to a portable electronic device so as to power that device and/or to a storage device for storing the generated electrical power.

13. A portable apparatus for generating electrical power comprising:
a stator comprising one or more conductive coils, coil units or coil segments; and
a reciprocator comprising a magnet, the reciprocator being responsive to vibrations and/or shocks and which is arranged to move within an environs of the stator so as to generate electrical power, wherein the reciprocator comprises a first magnet carrier and a second magnet carrier, the first and second carriers being cross-linked through a pivot so as to be moveable in opposite directions with respect to each other;
wherein the apparatus is connectable to a portable electronic device so as to power that device and/or to a storage device for storing the generated electrical power.

14. A method of generating electrical power comprising:

providing an apparatus comprising a stator comprising one or more conductive coils, coil units or coil segments and a reciprocator comprising a magnet, the reciprocator being responsive to vibrations and/or shocks and which is arranged to move within an environs of the stator so as to generate electrical power, wherein the reciprocator comprises a first magnet carrier and a second magnet carrier, the first and second carriers being cross-linked through a pivot so as to be moveable in opposite directions with respect to each other;

vibrating and/or shocking said reciprocator so that said reciprocator moves within the environs of the stator so as to generate electrical power; and connecting the apparatus to a portable electronic device so as to power that device and/or to a storage device for storing the generated electrical power.

\* \* \* \* \*